United States Patent [19]

Struckman et al.

[11] 4,194,525
[45] Mar. 25, 1980

[54] FLOAT ARM OPERATED VALVE

[76] Inventors: Edmund E. Struckman, 46 Charles Henwood Ave., Southridge; Harold S. Larsen, 27b Northcliffe Ave., Westville, both of Durban, Natal, South Africa

[21] Appl. No.: 883,946

[22] Filed: Mar. 6, 1978

[30] Foreign Application Priority Data

Oct. 5, 1977 [ZA] South Africa ............... 77/5972

[51] Int. Cl.² ................. F16K 31/18; F16K 33/00
[52] U.S. Cl. ................................. 137/438; 137/443
[58] Field of Search ............ 137/434, 442, 443, 445, 137/438

[56] References Cited

U.S. PATENT DOCUMENTS

| 947,106 | 1/1910 | Kirk | 137/443 |
|---|---|---|---|
| 1,041,257 | 10/1912 | Ellis | 137/445 |
| 1,148,835 | 8/1915 | Florey | 137/442 |
| 2,430,152 | 11/1947 | Wiley | 137/445 |
| 3,406,711 | 10/1968 | Fogg | 137/445 |

FOREIGN PATENT DOCUMENTS

| 137323 | 2/1901 | Fed. Rep. of Germany | 137/438 |
|---|---|---|---|
| 1202568 | 1/1960 | France | 137/438 |
| 866677 | 4/1961 | United Kingdom . | |
| 1088556 | 10/1967 | United Kingdom . | |
| 1290140 | 9/1972 | United Kingdom . | |
| 1314931 | 4/1973 | United Kingdom | 137/438 |

*Primary Examiner*—Martin P. Schwadron
*Assistant Examiner*—G. L. Walton
*Attorney, Agent, or Firm*—Young & Thompson

[57] ABSTRACT

A liquid level control valve including a cylinder member formed with a passage between an inlet and an outlet; a piston member slidable within the cylinder member, the piston and cylinder members being movable with respect to each other between a position in which the piston obturates the passage through the cylinder and a position in which the passage is open; a lever arm pivoted about an axis on one of the members and connectable to a float so that it is movable in response to the movement of the float on a body of liquid the level of which is to be controlled; and a linkage pivotally connected between the other member and the lever arm at a position on the lever arm spaced from the first mentioned pivot axis.

2 Claims, 12 Drawing Figures

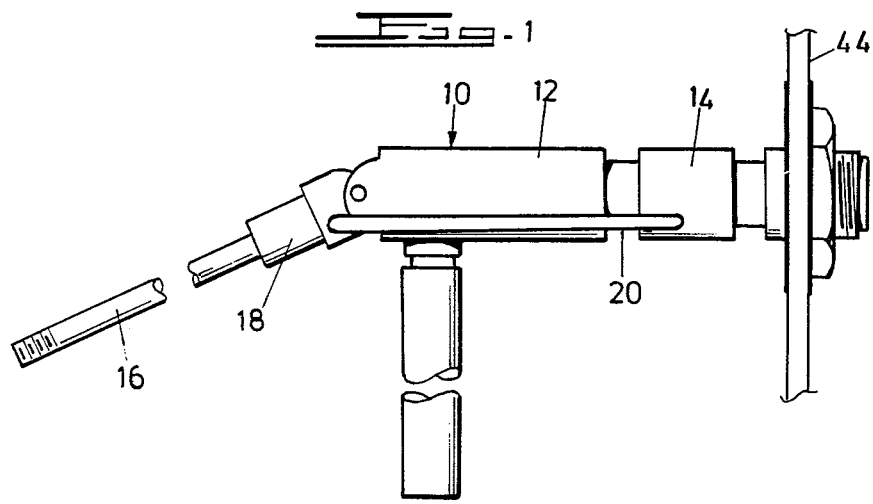
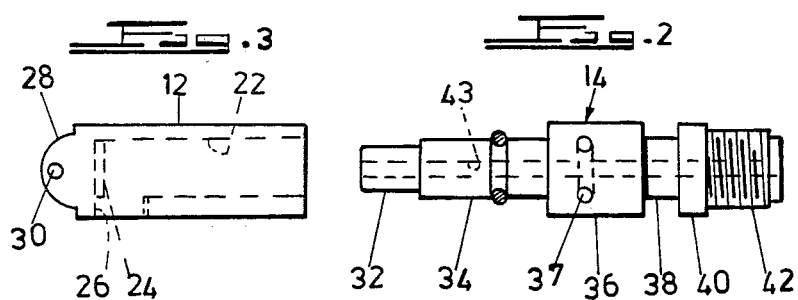
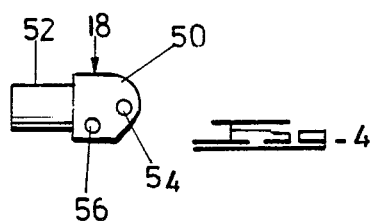

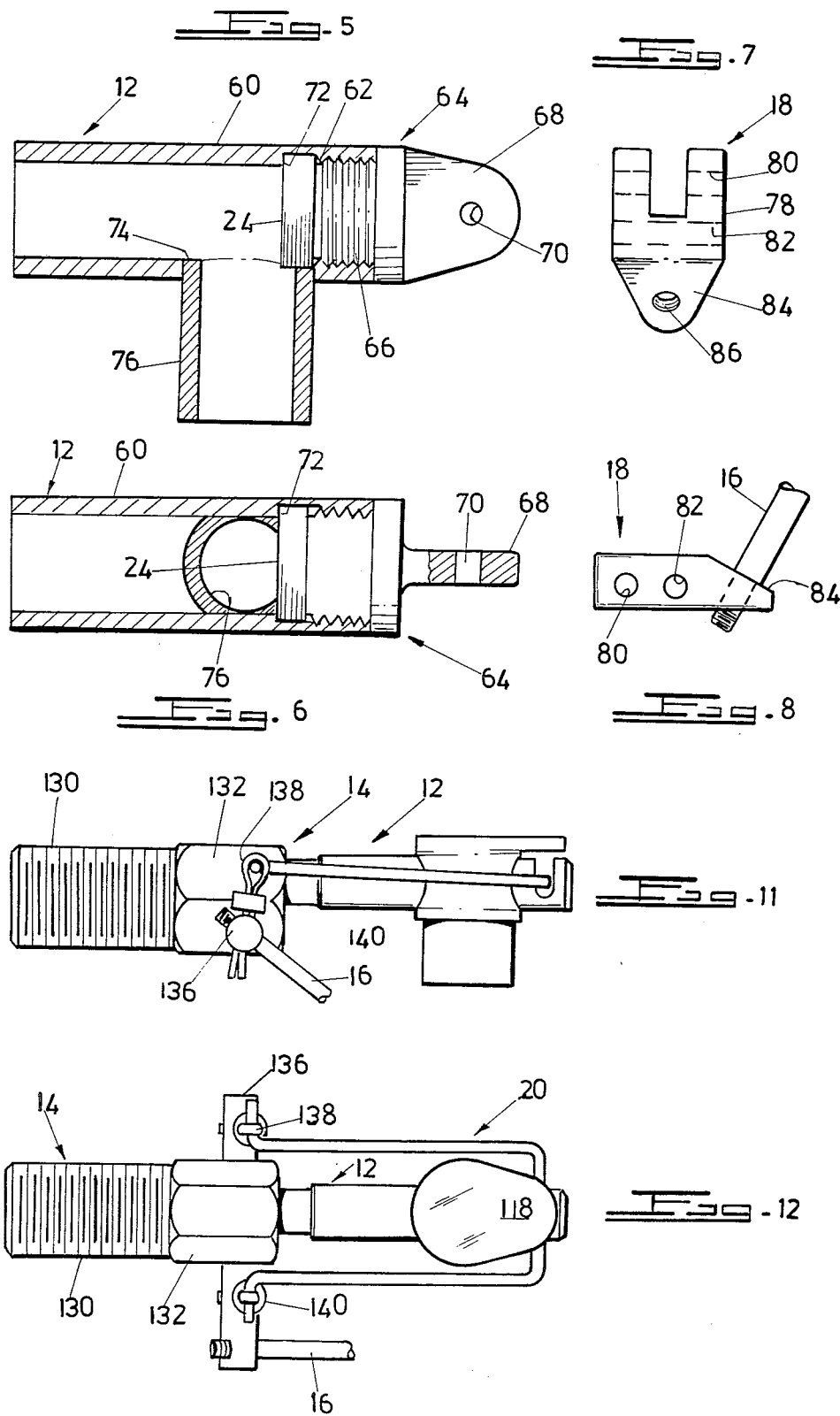

FLOAT ARM OPERATED VALVE

BACKGROUND TO THE INVENTION

This invention relates to valves and is particularly concerned with liquid level control valves of the type known as float valves, in which a valve member is caused to move between open and closed positions according to the movement of a float on the surface of a liquid.

There are many designs of float valves, but without going into any detail they generally include a piston member and a cylinder member, one being fixed and the other being movable with the movable member being actuated by the lever carrying the float. To the applicant's knowledge the engagement between movable member and lever is always of a sliding and pivoting nature with an arm or portion of the lever acting directly on the movable member. Experience has shown that known float valves are not very reliable in service and it is thought that this is mostly as a result of wear at the engaging surfaces of lever and a movable member.

It is an object of the invention to provide a liquid level control valve which will be reliable in service, yet be relatively inexpensive to manufacture.

SUMMARY OF THE INVENTION

According to the invention, in a liquid level control valve of the type generally described above, the lever arm is pivoted about an axis on one of the members and a linkage is pivotally connected between the other member to which the lever arm is not pivoted and the lever arm at a position on the lever arm spaced from the first mentioned pivot axis. With this construction there is only rotational and no sliding movement between the lever arm and the member which it causes to move and any wear which takes place will not adversely affect the manner in which the lever arm forces the movable member into a closed position.

Preferably the piston member is fixed, e.g. to the walls of a cistern, and is formed with a through-bore for the supply of liquid to the cistern. The cylinder member is movable on the piston member. In one form of the invention the lever arm is pivoted on the cylinder and the linkage extends between a position along the length of the lever arm and the fixed piston member. In another form of the invention the lever arm is secured to a spindle that is journalled on the piston member, and the linkage extends between the cylinder member and a radially extending projection on the spindle.

The invention is further described by way of example with reference to the accompanying drawings.

BRIEF DESCRIPTION OF DRAWINGS

FIG. 1 shows a side view of an embodiment of the invention;

FIGS. 2 to 4 show in more detail, but on the same scale, some of the important parts of the valve shown in FIG. 1, namely FIG. 2 shows a piston member, FIG. 3 shows a cylinder member, and FIG. 4 shows a connecting member for connecting a lever arm to the cylinder member;

FIG. 5 shows on an enlarged scale a partly sectioned side view of a varient of cylinder for the valve of FIGS. 1 to 4;

FIG. 6 shows a plan view of the cylinder member of FIG. 5;

FIG. 7 shows schematically a variant of connecting member;

FIG. 8 shows a plan view of the connecting member of FIG. 7;

FIG. 11 shows a schematic side view of yet another variant of the invention; and FIG. 12 shows a plan view of the variant of FIG. 11.

DETAILED DESCRIPTION OF EXAMPLES OF THE INVENTION

Figure 9:
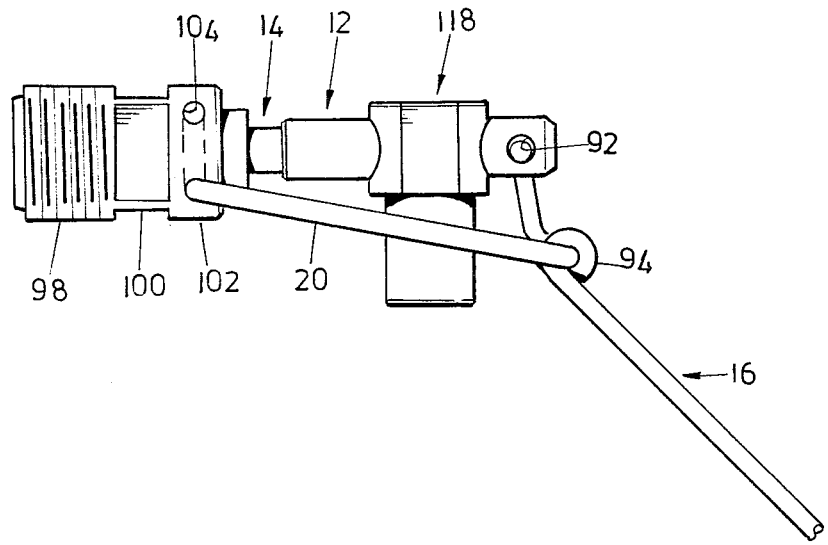
FIG. 9 shows a diagrammatic side view of an inexpensive variant of the valve of the invention.

In the drawings the same reference numerals are used for similar parts.

Referring to FIGS. 1 to 4, a valve denoted 10 includes a movable cylinder member 12, a fixed piston member 14, a lever arm 16 for supporting a float which is not shown, a connecting member 18 connected to the lever arm 16 and pivoted on the cylinder 12, and a linkage 20 connected between the connecting member 18 and the piston member 14.

As shown in FIG. 3, the cylinder member 12 is formed with a bore 22, is open at one end and is closed at the other end. An elastomeric washer 24 is positioned against the closed end. An outlet 26 is formed through the walls of the cylinder adjacent the closed end. The body of the cylinder adjacent the closed end is provided with a flange 28 which is formed with a through-hole 30.

As shown in FIG. 2 the piston 14 is composed of a number of different diameter portions of which there is a small diameter portion 32 at the forward end of the piston member which penetrates most deeply into the cylinder member 12, and a slightly greater diameter portion 34 which is a close fit in the bore 22 of the cylinder, an enlarged portion 36 which is formed with four through holes 37 forming a square when viewed along the axis of the piston member, a portion 38 which is square in cross section so that the valve can be turned with a spanner, a boss 40 for supporting a washer, and a threaded portion 42. The piston is formed with a through bore 43 forming a flow path for supply liquid. An O-ring 35 is provided in a groove formed in the portion 34 to effect a seal between the piston portion 34 and bore 22 of the cylinder 12.

The fitting of the piston to a cistern wall 44 is conventional and is shown schematically in FIG. 1.

In FIG. 4 the connecting member 18 includes a body part 50 that is formed with two holes 54 and 56 and an internally threaded tube for receiving and engaging a correspondingly threaded portion of the lever arm 16.

As shown in FIG. 1 the connecting member 18 is pivoted on the cylinder 12 by a pin which passes through the hole 30 in the cylinder and the hole 54 in the connecting member. The linkage 20 is provided on the connecting member and the piston using the holes 56 and 37. The linkage 20 may be any suitably bent rod, for example bent into a U-shape or into a rectangular shape.

In practice the valve is fixed to a cistern by firstly dismantling the valve by removing the linkage 20, securing the piston to the cistern wall and supply line, and reassembling the valve. As the water level in the cistern rises, the float on the end of the arm 16 rises and forces the lever arm upwardly. This causes the linkage to be pulled because it is pivoted eccentrically from the pivot for the lever arm. The force on the linkage causes the cylinder and parts connected to it, as a whole, to move towards the piston which is fixed. When this occurs the forward end of the piston is forced against the washer 24 to prevent further liquid from entering the cistern.

As will be appreciated by persons skilled in the art, in a suitable construction, the cylinder can be fixed and the piston be movable.

FIGS. 5 and 6 show a variant of cylinder member 12 which is perhaps most suitable for mass production. The cylinder member comprises a tube 60 which is threaded at one end 62 to engage threads 66 on a plug 64. The plug 64 has a flange 68 formed with a hole 70 so that a connecting member 18 can be connected to it. The tube is formed internally with a shoulder 72 adjacent the threads 62 so that in use a washer 24 can be inserted into the tube 60 through the threaded end and then held in position against the shoulder 72 by the plug 64. Adjacent the threaded portion 62 of the tube 60 there is a transverse hole 74 which receives with an interference fit an outlet tube 76. A plastics or other extension pipe can be connected to the outlet tube 76 so that water issuing from the valve can be discharged below the level of liquid already in the cistern.

FIGS. 7 and 8 show a variant of connecting member 18 which is formed with a bifurcated portion 78 that is formed with two bores 80 and 82 and a tapered portion 84 formed with a threaded bore 86 to receive the end of a lever arm 16.

Figure 10:
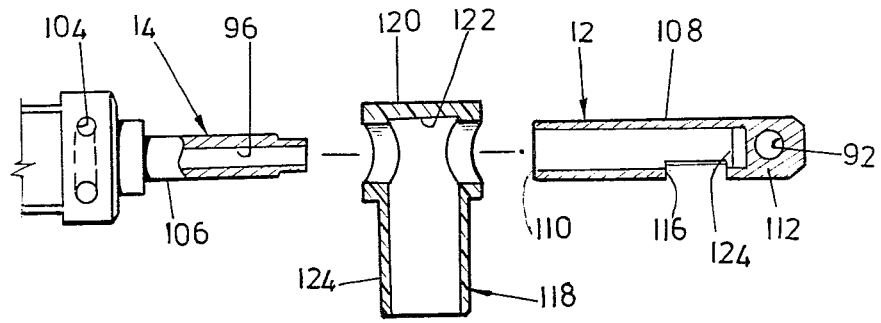
FIG. 10 shows on the same scale but with parts exploded and partially sectioned the valve of FIG. 9.

FIGS. 9 and 10, of which FIG. 10 is an exploded partially sectioned view of FIG. 9, there is shown an inexpensive form of valve according to the invention. In this variant the lever arm 16 has a portion adjacent one end bent into a coil 94 which provides a journal for the linkage 20. The end of the lever arm adjacent the coil is cranked so that it can engage directly in a bore 92 formed in the cylinder member 12. The piston member 14 includes a threaded portion 98, a square portion 100 a boss 102 formed with two through bores 104 for receiving a linkage 20 and a plunger portion 106. There is a bore 96 which goes right through the piston 14. The cylinder member 12 includes a cylinder 108 which is open at one end 110 and closed at the other 112 at which end the hole 92 is formed for receiving the lever arm 16. A washer 24 is positioned against the closed end of the cylinder 108. Adjacent the closed end there is a transverse bore 116. An outlet fitting 118 is fitted to the cylinder and covers the opening 116. As is best seen in FIG. 10 the outlet fitting 118 includes a head portion 120 formed with a bore 122 which sealably receives the cylinder 108 and a hollow tail portion 124 which communicates with the outlet 116 to form an outlet extension for the cylinder member. The outlet fitting is conveniently made of a plastics material so that, as will be appreciated, the whole construction of cylinder member 12, outlet fitting 118, and lever arm 16 of this embodiment will be very inexpensive.

Finally FIGS. 11 and 12 show a variant of valve according to the invention which is suitable for use with large diameter pipes or for use with systems in which there is a high system fluid pressure. In this variant the piston member 14 includes a threaded portion 130 and a large nut portion 132 which is formed with a bore 134 which receives rotatably a spindle 136. The spindle extends beyond the portion 132 and on these laterally extending portions there are radially extending projections 138, which in practice would be cotter pins. The head of each cotter pin 138 is spaced from the axis of the spindle 136 by a washer 140. A lever arm 16 is secured to the spindle 136. As will be appreciated the projections 138 are in effect extensions of the lever arm 16. The cylinder member 12 is in essence much the same as that shown in FIGS. 9 and 10 and will not therefore be described further. The linkage 20, which is best seen in FIG. 12, is U-shaped with the ends of the U being bent to form feet that extend into the holes of the cotter pins 138. In practice this construction permits rapid disassembly and assembly of the valve since all that is required is to squeeze the legs of the linkage 20 together whereupon the cylinder is detachable from the piston member. With this construction the force applied to effect a seal between the piston member and washer 24 is, amongst other things, controlled by the length of the projection 138, or in other words the leverage it can exert.

Shortening the projection 138 will increase the closing force.

We claim:

1. A liquid level control valve including a piston member formed with a passage between an inlet and an outlet and extending from a body provided with means for connecting the passage to a liquid supply; a cylinder member slidable over the piston member between a first and a second position, the cylinder member being formed with a transverse perforation whereby liquid can flow along a flow path including the passage in the piston, the cylinder member and the perforation; means for obturating the flow path when the cylinder member is moved to the first position; a spindle journalled on the body for pivotal movement about a substantially horizontal axis; a lever arm transverse to and connected to the spindle at one end and connectable to a float at its other end so that the spindle will rotate in response to movement of the float on a body of liquid the level of which is to be controlled; at least one radial projection on the spindle; and a linkage pivotally connected between the radial projection and the cylinder member so that movement of the float causes the cylinder member to move between its first and second positions.

2. A liquid level control valve as claimed in claim 1, and means for fixing the piston in use, with the cylinder member movable on the piston member.

* * * * *